United States Patent [19]
Delamare et al.

[11] Patent Number: 5,652,473
[45] Date of Patent: Jul. 29, 1997

[54] ROTARY ASSEMBLY INCLUDING IN PARTICULAR RADIAL SUPPORT MEANS AND A MAGNETIC AXIAL ABUTMENT

[75] Inventors: Jérôme Delamare, Grenoble; Jean-Paul Yonnet, Meylan; Denis Perrillat-Amede, Annecy, all of France

[73] Assignee: Alcatel Cit, Paris, France

[21] Appl. No.: 577,766

[22] Filed: Dec. 22, 1995

[30] Foreign Application Priority Data

Dec. 26, 1994 [FR] France ................... 95 15647

[51] Int. Cl.⁶ ................. H02K 7/08; H02K 7/09
[52] U.S. Cl. ............ 310/90.5; 310/90; 310/67 R; 310/156; 417/423.4
[58] Field of Search ........... 310/90.5, 90, 162, 310/156, 67 R; 417/423.2

[56] References Cited

U.S. PATENT DOCUMENTS

| | | | |
|---|---|---|---|
| 4,036,565 | 7/1977 | Becker | 417/420 |
| 4,082,376 | 4/1978 | Wehde et al. | 308/10 |
| 4,609,332 | 9/1986 | Miki et al. | 417/352 |
| 4,841,204 | 6/1989 | Struder | 318/254 |
| 4,883,981 | 11/1989 | Gerfast | 310/40 R |
| 5,166,566 | 11/1992 | Bernhardt et al. | 310/90.5 |
| 5,350,283 | 9/1994 | Nakazeki et al. | |

FOREIGN PATENT DOCUMENTS

| | | |
|---|---|---|
| 0470637A1 | 2/1992 | European Pat. Off. . |
| 2110581 | 6/1972 | France . |
| 4240718A1 | 6/1993 | Germany . |
| WO8401802 | 5/1984 | WIPO . |

Primary Examiner—Thomas M. Dougherty
Assistant Examiner—Karl I. E. Tamai
Attorney, Agent, or Firm—Sughrue, Mion, Zinn, Macpeak & Seas

[57] ABSTRACT

A rotary assembly comprising a stator and a rotor of axis Δ, rotary drive means, radial support means, and an active magnetic axial abutment comprising a magnetic circuit in two portions, namely a fixed portion, and a moving portion, the two portions being separated from each other by two parallel plane air gaps, each portion of said magnetic circuit being circularly symmetrical about axis Δ, and having the shape of an open channel-section extending about said axis Δ, the open ends of the two portions of magnetic circuit facing each other, an electrical coil being received in the inside annular space of the fixed portion of the magnetic circuit, wherein a drive winding secured to said axial abutment coil and received in the inside annular space of the moving portion of said magnetic circuit co-operates with permanent magnets fixed to the moving portion of said magnetic circuit, and facing said drive winding.

7 Claims, 3 Drawing Sheets

ROTARY ASSEMBLY INCLUDING IN PARTICULAR RADIAL SUPPORT MEANS AND A MAGNETIC AXIAL ABUTMENT

BACKGROUND OF THE INVENTION

The present invention relates to a rotary assembly comprising a stator and a rotor of axis Δ, rotary drive means, radial support means, and an active magnetic axial abutment comprising a magnetic circuit in two portions, namely a fixed portion secured to the stator, and a moving portion secured to the rotor, the two portions being separated from each other by two parallel plane air gaps, each portion of said magnetic circuit being circularly symmetrical about axis Δ, and having the shape of an open channel-section extending about said axis Δ, the ends of each portion of the magnetic circuit forming two plane surfaces constituting two concentric circular bands centered on the axis Δ, and perpendicular thereto, the open ends of the two portions of magnetic circuit facing each other, an electrical axial abutment coil being received in the inside annular space of the fixed portion of said magnetic circuit.

The invention is particularly applicable to vacuum pumps such as turbomolecular blade pumps of the Holweck type.

OBJECT AND BRIEF SUMMARY OF THE INVENTION

An object of the invention is to make the assembly more compact, easier to assemble, and cheaper.

To this end, the invention provides a rotary assembly as defined above, wherein a stator drive winding secured to said axial abutment coil and received in the inside annular space of the moving portion of said magnetic circuit co-operates with permanent magnets fixed to the moving portion of said magnetic circuit, and facing said stator drive winding.

In a particular embodiment, said stator drive winding is a single-phase winding having four coils forming two pairs of poles having axes perpendicular to axis Δ, which winding is fed with alternating current by an inverter automatically commutated by a Hall-effect cell detecting the angular position of the rotor.

In order to angularly position the rotor when it is stationary so as to impose the rotation direction and maximum torque on start-up, a permanent magnet is placed at the center of at least one coil of said winding, the polarity of said magnet being tangential.

BRIEF DESCRIPTION OF THE DRAWINGS

A particular embodiment of the invention is described below with reference to the accompanying drawings, in which.

MORE DETAILED DESCRIPTION

Figure 1:
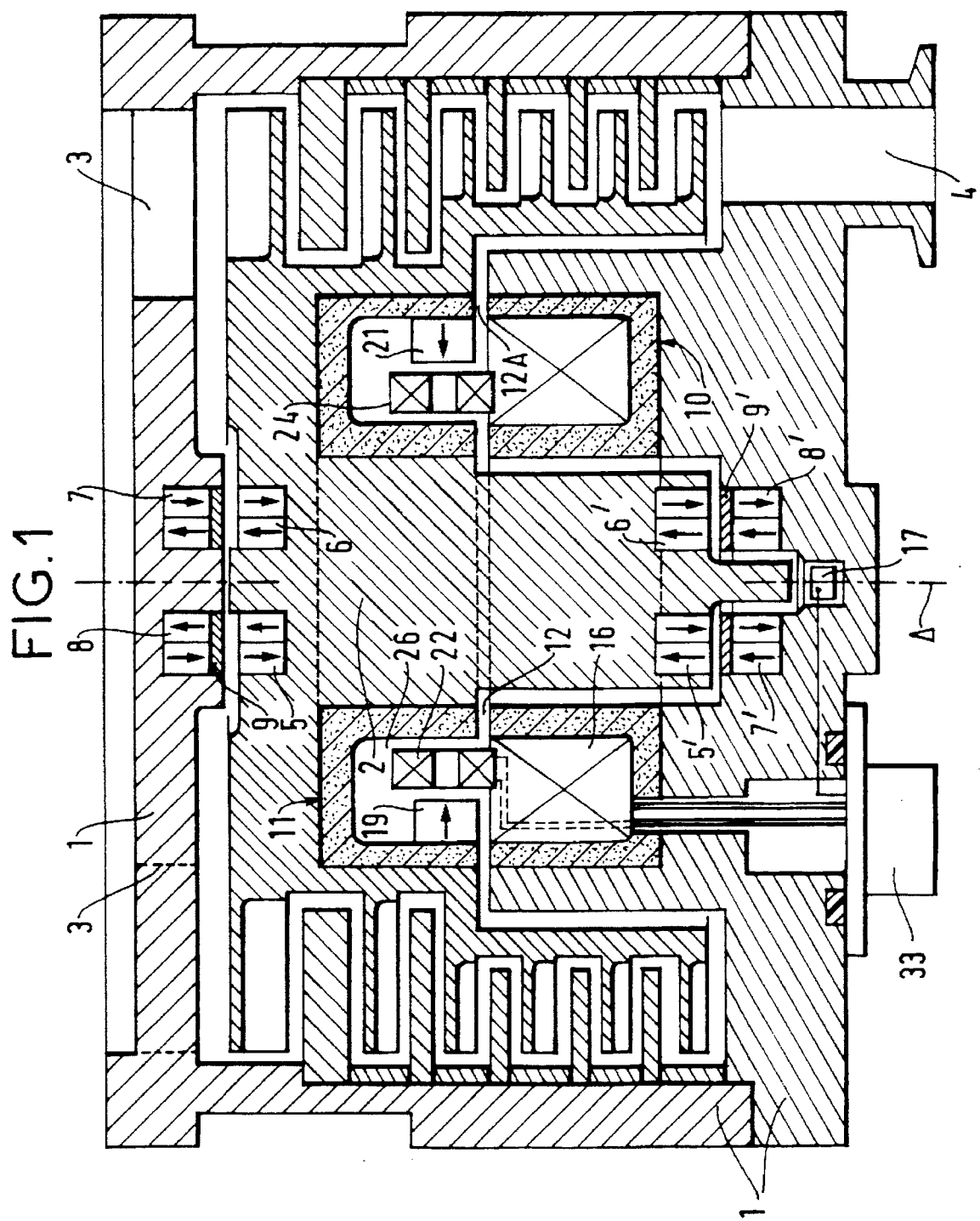
FIG. 1 shows a turbomolecular pump constituting a particular application for a rotary assembly of the invention.

FIG. 1 shows a particular application of the invention. In this example, the application is to a turbomolecular pump.

The pump comprises a stator 1 and a rotor 2 of axis Δ. The stator is provided with a plurality of inlet orifices 3, and one outlet orifice 4.

The rotor is rotated by a synchronous motor having permanent magnets, and it is magnetically suspended by means of an active magnetic axial abutment, and of two radial bearings spaced apart along the axis Δ. The two radial bearings are constituted by respective passive magnetic centering devices mounted in attraction, each of which includes firstly two annular rings 5 and 6 (5' and 6') that are axially magnetized in opposite directions and that are disposed on the rotor, and secondly two annular rings 7 and 8 (7' and 8') that are axially magnetized in opposite directions and that are disposed on the stator. On the stator portion, each passive magnetic centering device further includes a passive eddy-current damper, e.g. a copper washer 9 or 9'.

Figure 2:
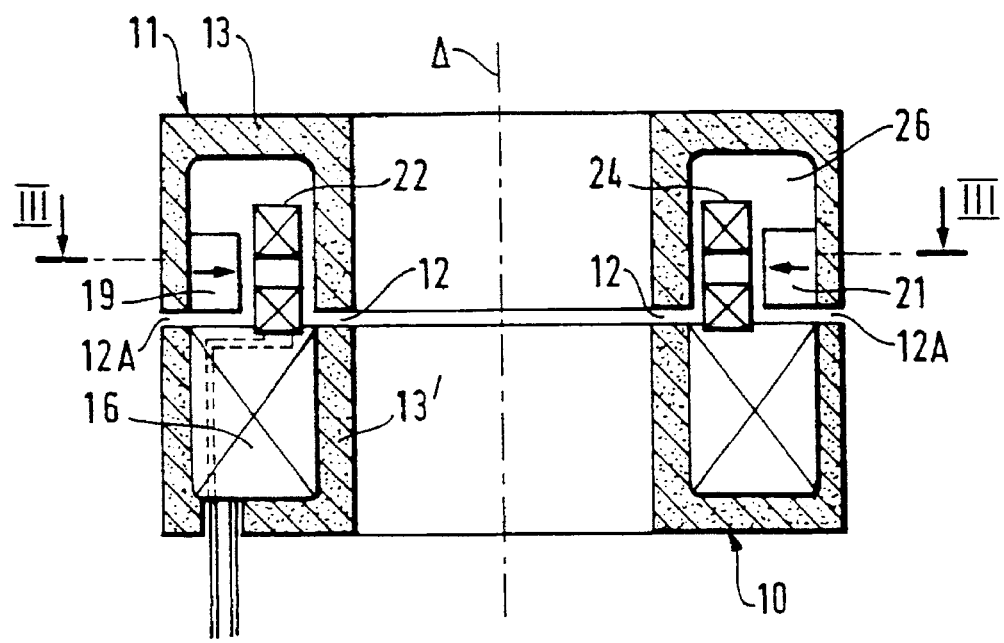
FIG. 2 is a section on II—II of FIG. 3 showing the rotary drive means and the active axial abutment of the rotary assembly of FIG. 1.
Figure 3:
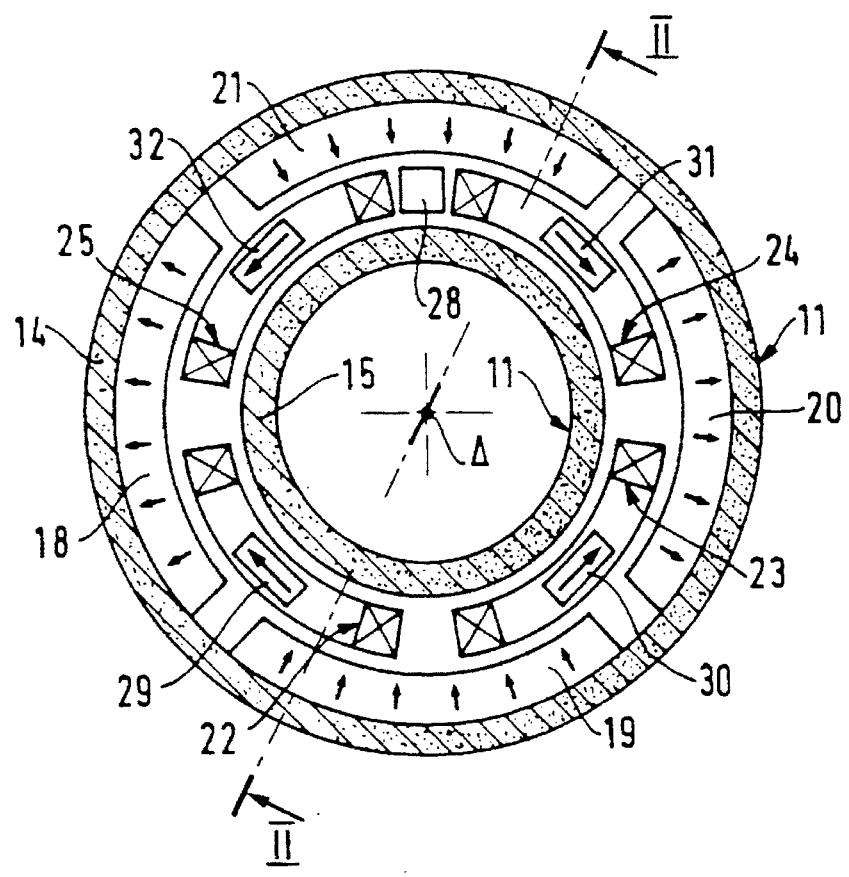
FIG. 3 is a section on III—III of FIG. 2, showing the position of the rotor when it is stationary.

With more particular reference to FIGS. 2 and 3, a description follows of the combination comprising the rotary drive motor and the active axial magnetic abutment, which combination is specific to the invention and makes the assembly more compact and cheaper.

The active axial magnetic abutment comprises a magnetic circuit in two portions 10 and 11, separated from each other by two air gaps 12 and 12A.

As shown in FIG. 1, the portion 10 is secured to the stator and is therefore a fixed portion, and the portion 11 is secured to the rotor and is therefore a moving portion.

The air gaps 12 and 12A are plane and parallel, but they are not necessarily in the same plane, or of the same magnitude.

Each of the two portions 10 and 11 of the magnetic circuit is circularly symmetrical about the axis Δ, and it has the shape of an open channel-section 13 (13') extending about said axis Δ. The open ends of the two portions 10 and 11 of the magnetic circuit face each other, and, for each portion, said ends form a plane surface constituting two circular bands which are co-planar and concentric, and which are centered on the axis Δ and perpendicular thereto. The two bands are identical to the bands referenced 14 and 15 in FIG. 3, and corresponding to the section plane referenced III—III in FIG. 2. An axial abutment electric coil 16 is received in the inside annular space of the stator portion 10 of the magnetic circuit.

Information supplied by an axial position detector 17 disposed on the stator (see FIG. 1) is used to control the magnitude of the current flowing through the electric coil.

Since the axial abutment attracts, provision is made so that the zero position of the rotor in the stator is offset upwards so that the rotor is attracted upwards by the top bearing 5, 6, 7, 8. The current flowing through the axial abutment coil 16 generates downward attraction that balances the upward attraction.

The rotary drive motor includes a rotor magnetic circuit which is constituted by the moving portion 11 of the above-described magnetic circuit. In this way, the drive motor uses a portion of the magnetic circuit of the active axial abutment.

The motor is a synchronous motor having permanent magnets. In the example described, there are four permanent magnets 18, 19, 20, and 21 fixed to the moving portion 21 of the magnetic circuit in the inside annular space 26 of said moving portion of the magnetic circuit. The motor further includes a single-phase stator winding having four coils 22, 23, 24, and 25 connected in series so as to form two pairs of poles. These coils are situated in the inside annular space 26 of the moving portion of the magnetic circuit, facing the magnets 18 to 21 and co-operating therewith. The axes of the coils 22 to 25 are perpendicular to the axis A. The assembly comprising the coils 22 to 25 of the motor and the coil 16 of the axial abutment is embedded in a resin. In this way the assembly forms a rigid block.

Figure 6:
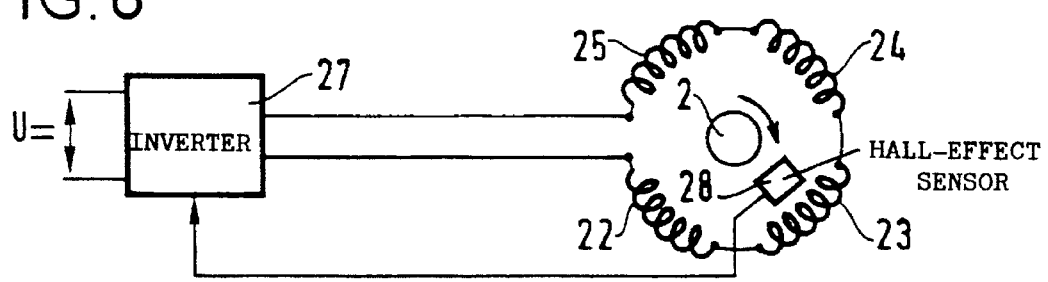
FIG. 6 is a simplified block diagram showing how the stator drive winding is powered.

The winding constituted by the four coils 22 to 25 is fed with alternating current by an inverter 27 (FIG. 6) which is automatically commutated by a Hall-effect sensor 28 detecting the angular position of the rotor.

The speed of rotation of the motor is determined by the DC voltage U delivered by the inverter 27, voltage may be either fixed or variable depending on whether a fixed or a variable speed of rotation is desired.

As shown in FIG. 3, the Hall-effect sensor 28 is placed between two coils of the stator winding. In the example shown, it is placed between the coils 24 and 25.

Finally, in order to set the rotation direction of the machine on start-up with maximum torque, the rotor is angularly positioned when it is stationary by means of small permanent magnets 29, 30, 31, and 32, each of which is placed at the center of a respective coil 22, 23, 24, and 25. They are magnetized tangentially as indicated by the arrows. It should be noted that, in all of the figures, the arrows indicate the polarity directions of the permanent magnets or of the coils (FIG. 4), except for arrow F in FIG. 4, which arrow indicates the direction of rotation.

In this example, four permanent magnets 29, 30, 31, and 32 are provided for angularly positioning the rotor when it is stationary. However, only one such magnet is necessary for positioning the rotor.

Four magnets are used so as to balance the assembly, by cancelling out the radial forces tending to move the rotor off-center.

FIG. 3 shows the angular position of the rotor when it is stationary. The coils 22 to 25 are therefore not powered.

Figure 4:
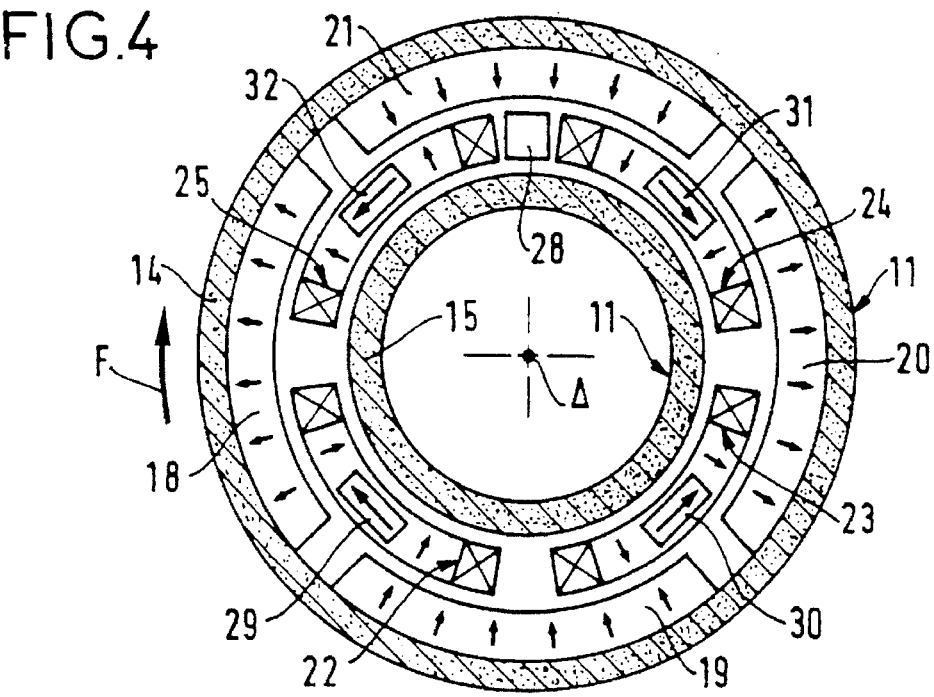
FIG. 4 is the same as FIG. 3 but at the instant of starting, with the rotation direction and the polarities of the coils of the stator winding being indicated.

FIG. 4 shows the same position but at the instant at which the rotor is started up. The coils 22 to 25 are powered such that their polarities are those indicated by the arrows, and, as a result the rotor starts rotating in the direction indicated by the arrow F.

Figure 5:
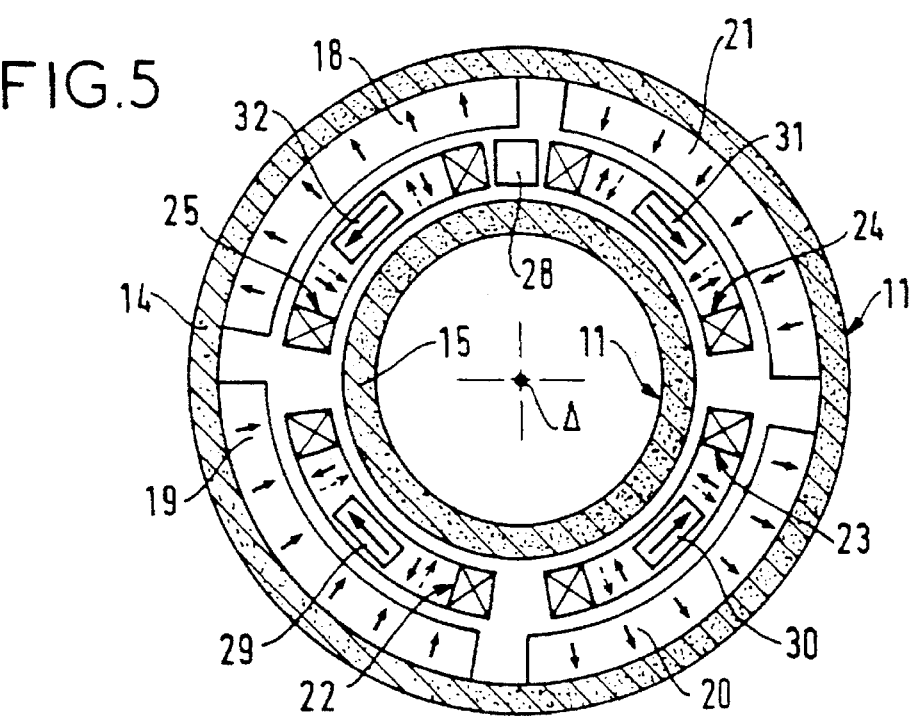
FIG. 5 shows the position of the rotor portion at the instant at which the direction of the current flowing through the winding is reversed, and therefore at which the polarity of the coils in the winding is reversed.

Finally, FIG. 5 shows the position of the rotor at the instant at which the coils are commutated as a result of the information supplied by the Hall-effect sensor 28 which detects polarity reversal in the magnetic field when the magnet 18 goes past it.

By combining the motor and the axial abutment, a significant reduction in volume can be obtained. Assembly is very simple and cheap. Furthermore, there is no radial interaction between the rotor and the stator since the coils 22 to 25 are in air with no iron.

An electrical connector 33 for connecting the pump to the power supply is situated at the bottom of the pump.

We claim:

1. A rotary assembly comprising a stator and a rotor of axis A, rotary drive means, radial support means, and an active magnetic axial abutment comprising a magnetic circuit in two portions, namely a fixed portion secured to the stator, and a moving portion secured to the rotor, the two portions being separated from each other by two parallel plane air gaps, each portion of said magnetic circuit being circularly symmetrical about axis A, and having the shape of an open channel-section spaced from said axis A, the open ends of the two portions of the magnetic circuit facing each other and forming two plane surfaces constituting two concentric circular bands centered on the axis A, and perpendicular thereto, open ends of the two portions of magnetic circuit facing each other, an electrical axial abutment coil being received in the inside annular space of the fixed portion of said magnetic circuit, wherein a stator drive winding secured to said axial abutment coil and received in the open channel section of the moving portion of said magnetic circuit co-operates with permanent magnets fixed to the moving portion of said magnetic circuit, and facing said stator drive winding.

2. An assembly according to claim 1, wherein said stator drive winding is a single-phase winding having four coils forming two pairs of poles having axes perpendicular to axis A, which winding is fed with alternating current by an inverter automatically commutated by a Hall-effect cell detecting the angular position of the rotor.

3. An assembly according to claim 2, wherein said Hall-effect sensor is situated between two consecutive poles of said winding.

4. An assembly according to claim 2, wherein a permanent magnet is placed at the center of at least one coil of said winding, the polarity of said magnet being tangential.

5. An assembly according to claim 1, wherein said radial support means comprise two passive magnetic centering devices offset axially from each other along axis A.

6. An assembly according to claim 1, wherein the current flowing through said axial abutment coil is controlled on the basis of information supplied by an axial position detector.

7. An assembly according to claim 1, wherein said stator and said rotor are the stator and the rotor of a vacuum pump.

* * * * *